(12) United States Patent
Balmain et al.

(10) Patent No.: US 6,844,714 B2
(45) Date of Patent: Jan. 18, 2005

(54) SATELLITE CHARGE MONITOR

(76) Inventors: Keith G. Balmain, 44 Jackes Ave., Apt. 1904, Toronto (CA), M4T 1E5; Peter C. Kremer, 5 Terry Court, Georgetown (CA), L7G 1PG; Gerald R. Dubois, 98 Roosevelt Road, Toronto (CA), M4J 4T9

(*) Notice: Subject to any disclaimer, the term of this patent is extended or adjusted under 35 U.S.C. 154(b) by 141 days.

(21) Appl. No.: 10/369,521

(22) Filed: Feb. 21, 2003

(65) Prior Publication Data

US 2004/0166814 A1 Aug. 26, 2004

(51) Int. Cl.⁷ .......................... G01R 31/02; B64G 1/00
(52) U.S. Cl. ...................................... 324/72; 244/158 R
(58) Field of Search ................ 324/72, 71.3, 71.4, 324/76.11, 678, 72.5, 96, 446, 447, 450; 244/158 R, 173, 1 A; 136/244, 292; 320/101, 136; 342/352; 348/117; 701/13; D12/319, 320; 250/326, 397, 305, 336.1, 363.01; 315/111.81; 361/218

(56) References Cited

U.S. PATENT DOCUMENTS

| | | | | |
|---|---|---|---|---|
| 3,450,879 A | * | 6/1969 | Seppi | 250/336.1 |
| 3,567,925 A | * | 3/1971 | Muga et al. | 250/363.01 |
| 3,740,636 A | * | 6/1973 | Hogrefe et al. | 320/101 |
| 3,984,730 A | * | 10/1976 | Hunter | 361/218 |
| 4,576,348 A | | 3/1986 | Zuccaro | |
| 4,839,581 A | * | 6/1989 | Peterson, Jr. | 324/72 |
| 4,886,221 A | * | 12/1989 | Honigsbaum | 244/1 A |
| 5,064,574 A | * | 11/1991 | Oldham et al. | 252/519.31 |
| 6,177,629 B1 | | 1/2001 | Katz | |
| 6,332,590 B1 | | 12/2001 | Oh | |
| 6,459,206 B1 | * | 10/2002 | Aguero et al. | 315/111.81 |
| 6,703,612 B2 | * | 3/2004 | Goembel | 250/305 |

OTHER PUBLICATIONS

Balmain, Keith G., "Space Experiment Design for Electrostatic Charging and Discharging", Canadian Aeronautics and Space Institute, Proceedings of the 9th CASI Conference on Astronautics Towards the Next Century in Space, Nov. 12–15, 1996, ISBN: 0–920203–11–6, pp. 115–121.

* cited by examiner

*Primary Examiner*—Jay Patidar
*Assistant Examiner*—Hoai-An D. Nguyen
(74) *Attorney, Agent, or Firm*—Lynn C. Schumacher; Hill & Schumacher

(57) ABSTRACT

The present invention provides a charge monitor for satellites for monitoring build up of electric charge due to charge particle fluxes impinging on the satellite. In one aspect of the invention the charge monitor includes an electrically conducting housing including at least two compartments with each compartment including a dielectric slab contained therein. An electrically conducting electrode is embedded in each dielectric slab a pre-selected distance below a top surface of the dielectric slab, the housing being mountable on a satellite with the top surface of the dielectric slab facing outwardly into space away from the satellite whereby charged particles emitted from sources external to the satellite penetrate the dielectric slab resulting in charge accumulation in each electrically conducting electrode, each electrically conducting electrode being electrically isolated from all other electrically conducting electrodes in the electrically conducting housing. The monitor includes an electrical voltage detector for sensing the floating DC voltage developed on the electrically conducting electrode in each dielectric slab, due to the charge accumulation, and converting the DC voltage into an AC voltage representative of a charge buildup on each electrically conducting electrode.

47 Claims, 10 Drawing Sheets

12 - Channel Charge Monitor

SATELLITE CHARGE MONITOR

FIELD OF THE INVENTION

This invention relates to a satellite charge monitor for monitoring electric charge buildup in various components making up a satellite.

BACKGROUND OF THE INVENTION

Earth-orbiting satellites are now very numerous and provide a wide range of services, mostly in the areas of communications and remote sensing. These satellites find themselves immersed in a hostile environment of high-energy charged particles (electrons and ions) that originate in the Sun, are emitted as the "solar wind", and eventually swirl around the Earth following complex paths that are strongly influenced by the Earth's magnetic field. Some of these charged particles enter the Earth's atmosphere to generate the visible aurora and others swoop past the Earth only to become involved in unstable oscillations that drive them backwards, once again towards the Earth. A fraction of all these particles eventually become trapped in relatively stable patterns known as the Van Allen belts (sometimes called "radiation belts").

Unfortunately, the regions most heavily populated with high-energy charged particles are also the regions most frequently used by satellites, so that encounters between them are inevitable. In general, the impacts of most types of energetic charged particles are capable of causing either temporary or permanent damage to satellite electronic circuits. In particular, the electrons usually are not sufficiently energetic to pass through an entire satellite but they are energetic enough to become deeply embedded in the satellite dielectric materials that are used for both thermal and electrical insulation. There, the electric charge can build up to the point of electrical breakdown and arc discharge, producing both electromagnetic interference and physical damage. Wires or other conductors that are electrically "floating" (i.e. not grounded to the satellite frame) represent a special danger because they can store a large quantity of electrostatic energy which can be severely damaging when it discharges.

It has been determined that over 90% of the satellite anomalies that have occurred over the last 25 years are likely owing to environmental effects with at least 50% of the total owing to charging and discharging within the satellite (H. C. Koons et al., "The Impact of the Space Environment on space Systems", The Aerospace Corporation, paper at the Spacecraft Charging Technology Conference, 2–6 Nov., 1997, Hanscom AFB).

Therefore, it would be very advantageous to provide satellite operators with sufficient warning of an impending discharge or breakdown, so that they can take mitigating measures to avoid problems. This necessitates providing a satellite charge monitor which is compact and can sense the voltage buildup in the dielectric materials representative of the dielectric materials from which the satellite is produced.

SUMMARY OF THE INVENTION

This present invention provides a compact charge monitor for monitoring buildup of charge in a satellite and includes probes embedded in various samples of dielectric materials and different embodiments of devices that measures the floating voltage potentials developed on the probes due to charge particle fluxes impinging on the monitor.

In one embodiment there is provided a charge monitor for satellites, comprising:
  a) an electrically conducting housing including at least two compartments with said at least two compartments each including a dielectric slab contained therein, each dielectric slab having a selected thickness;
  b) an electrically conducting electrode embedded in each dielectric slab a pre-selected distance below a top surface of the dielectric slab, said housing being mountable on a satellite with said top surface of said dielectric slab facing outwardly into space away from said satellite whereby charged particles emitted from sources external to the satellite penetrate said dielectric slab resulting in charge accumulation in each electrically conducting electrode producing a floating DC voltage on said electrically conducting electrode, each electrically conducting electrode being electrically isolated from all other electrically conducting electrodes in said electrically conducting housing; and
  c) detection means for sensing of the floating DC voltage developed on the electrically conducting electrode embedded in each dielectric slab, due to the charge accumulation, and converting the floating DC voltage into an AC voltage representative of a charge buildup on each electrically conducting electrode.

In this aspect of the invention the voltage detection means may include either moving parts or non-moving parts. In the embodiment having non-moving parts, the detection means comprises a pre-selected number of transducers equal to the number of said electrically conducting electrodes,
  each transducer including a first metallic diaphragm electrically connected to an associated electrically conducting electrode, a second metallic diaphragm spaced from said first metallic diaphragm and substantially parallel thereto on one side of said first metallic diaphragm, a means for vibrating said second metallic diaphragm at a pre-selected frequency, and a third metallic diaphragm located on the other side of said first metallic diaphragm and substantially parallel thereto, said first metallic diaphragm being electrically insulated so that it acquires the floating voltage potential developed on the electrically conducting electrode to which it is attached,
  said detection means including an oscillator circuit connected to said vibration means and a synchronous detection circuit electrically connected to said third metallic diaphragm, wherein vibrating said second metallic diaphragm at said pre-selected frequency produces an oscillating capacitance to the first metallic diaphragm which then induces an oscillating charge on said third metallic diaphragm, resulting in an oscillating current at said pre-selected frequency being injected into the synchronous detection circuit which converts said oscillating current into a DC voltage proportional to the floating DC voltage on the electrically conducting electrode.

In another aspect of the present invention there is provided a charge monitor for satellites, comprising:
  a sensor array including at least one sensor unit with the sensor array being attachable to a satellite;
  said at least one sensor unit including
  a) an electrically conducting housing defining a compartment containing a dielectric slab therein, said dielectric slab having a selected thickness, the electrically conductive housing being attachable to a satellite;
  b) an electrically conducting electrode embedded in said dielectric slab a pre-selected distance below a top surface of the dielectric slab, said housing being mountable on a satellite with said top surface of said dielectric slab facing outwardly into space away from said satellite whereby charged particles emitted from sources external to the satellite penetrate said dielectric slab resulting in charge accumulation in the electrically conducting electrode to produce a floating DC voltage, and c) detection means for sensing the floating DC voltage developed on the electrically conducting electrode in said dielectric slab, due to the charge accumulation, and converting the floating DC voltage into an AC voltage representative of a charge buildup on said electrically conducting electrode.

In this aspect of the invention the at least one sensor unit may be two or more sensor units pre-positioned with respect to each other.

In another aspect of the invention there is provided a satellite, comprising:

a) a satellite housing containing a power supply and a satellite payload including communication means for communicating with a satellite control center;

b) a charge monitor including an electrically conducting housing including at least two compartments with said at least two compartments each including a dielectric slab contained therein, each dielectric slab having a selected thickness, an electrically conducting electrode embedded in each dielectric slab a pre-selected distance below a top surface of the dielectric slab, said housing being mounted on said satellite housing with said top surface of said dielectric slab facing outwardly into space away from said satellite whereby charged particles emitted from sources external to the satellite penetrate said dielectric slab resulting in charge accumulation in each electrically conducting electrode producing a floating DC voltage on each electrically conducting electrode, each electrically conducting electrode being electrically isolated from all other electrically conducting electrodes in said electrically conducting housing; and detection means for sensing the floating DC voltage developed on the electrically conducting electrode embedded in each dielectric slab, due to the charge accumulation, and converting the floating DC voltage into an AC voltage representative of a charge buildup on each electrically conducting electrode, said charge monitor being connected to said communication means for communicating charge build-up data to the satellite control center.

The present invention also provides a satellite, comprising:

a satellite housing containing a power supply, satellite payload including communication means for communicating with a satellite control center; and a charge monitor including a sensor array including at least one sensor unit with the sensor array being attached to the satellite housing, said at least one sensor unit including a) an electrically conducting housing defining a compartment containing a dielectric slab therein, said dielectric slab having a selected thickness, the electrically conductive housing being attachable to a satellite;

b) an electrically conducting electrode embedded in said dielectric slab a pre-selected distance below a top surface of the dielectric slab, said housing being mountable on a satellite with said top surface of said dielectric slab facing outwardly into space away from said satellite whereby charged particles emitted from sources external to the satellite penetrate said dielectric slab resulting in charge accumulation in the electrically conducting electrode to produce a floating DC voltage, and c) detection means for sensing the floating DC voltage developed on the electrically conducting electrode in said dielectric slab, due to the charge accumulation, and converting the floating DC voltage into an AC voltage representative of a charge buildup on said electrically conducting electrode.

In this aspect of the invention the at least one sensor unit may be two or more sensor units pre-positioned with respect to each other.

BRIEF DESCRIPTION OF THE DRAWINGS

The present invention will now be described by way of example only, reference being had to the accompanying drawings in which.

DETAILED DESCRIPTION OF THE INVENTION

Figure 1:
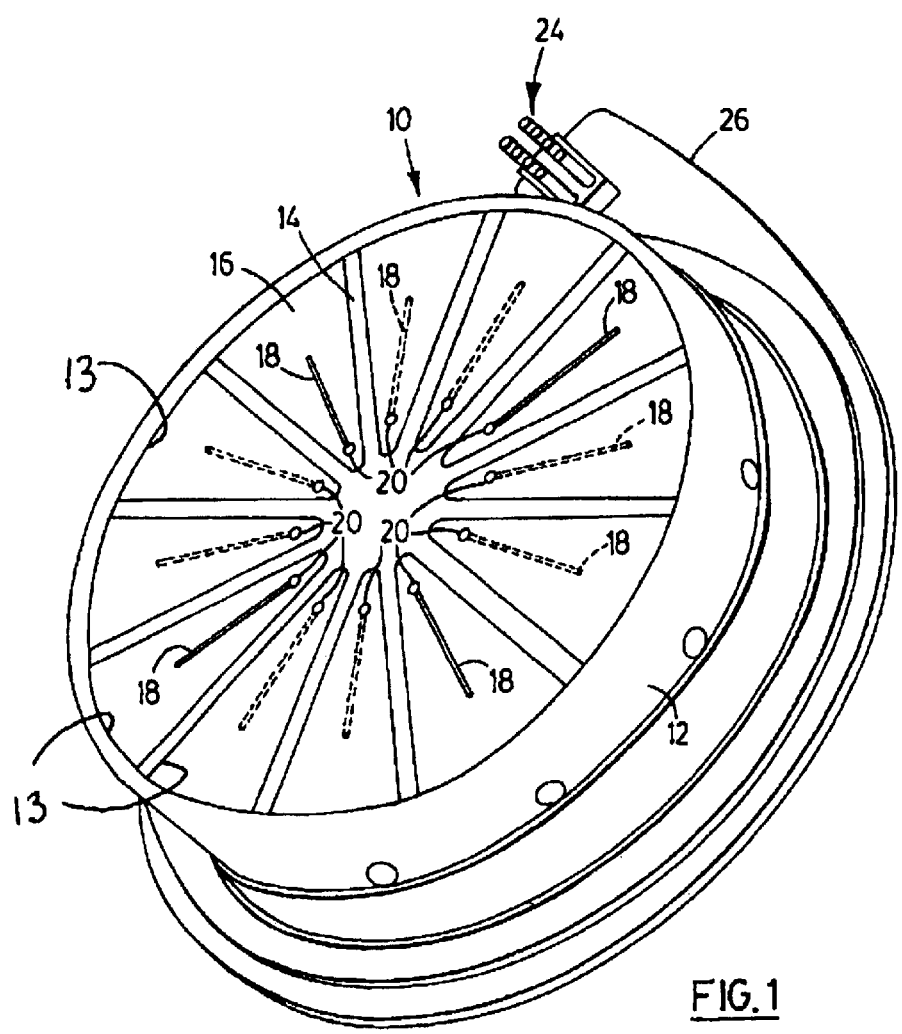
FIG. 1 is a perspective view of a satellite charge monitor constructed in accordance with the present invention.

Referring to FIG. 1, a satellite charge monitor shown generally at 10 includes a metal or otherwise electrically conducting housing 12 made for example of lightweight aluminum or alloy of aluminum. Housing 12 is divided into twelve pie-shaped compartments 13 separated by electrically conducting partitions 14 (which form part of the electrically conducting housing 12) with a pie-shaped slab of dielectric material 16 located in each of the twelve compartments 13. Each dielectric slab 16 has an electrical conductor 18 (e.g. wires) embedded in it. These wires 18 are embedded at different depths in the dielectric slabs 16 so for example three of the wires 18 may be flush with the top surface exposed to space being located in a groove formed in the top surface of the dielectric slab 16. It will be understood that wires per se are not necessary but any electrically conducting material may be used such as conducting foils, ribbons to mention just a few. Another set of three wires may be embedded at a depth of 2 mm in the interior of the dielectric slice and the other three slices may have the wires embedded to a depth of 4 mm from the top surface with the dielectric slices 16 being 6 mm thick. It will be appreciated however that the dielectric slices need not be restricted to being 6 mm thick and the depths of the wires 18 embedded in the slabs 16 may vary as well. Each compartment 13, surrounded by a partition wall 14, includes a metal or electrically conductive electrical conductors (e.g. wires) 18 lying horizontally in the dielectric slabs 16 that are connected to a metal wire 20 located in that particular compartment which in turn is connected to a electrically conductive charging post 22 (FIG. 2).

The dielectric slices or slabs 16 are preferably good insulators with low inherent conductivity and are selected to be representative of the materials used in the satellite itself. These could include typical insulators such as Mylar, Kapton, Rexolite, Kevlar, Teflon, acrylic, ceramic, or composites such as fiberglass, or multi-layer printed circuit boards, coaxial cables, etc. The electrical conductors or probes 18 may be embedded in the dielectric slabs 16 at various depths to allow monitoring at those depths of the potentials due to charge accumulation. By digital means, this device enables the measurement of many probes at frequent intervals, allowing the operators of the satellite system to monitor electric fields (potential gradients) building up within the material as described hereinafter.

Figure 2:
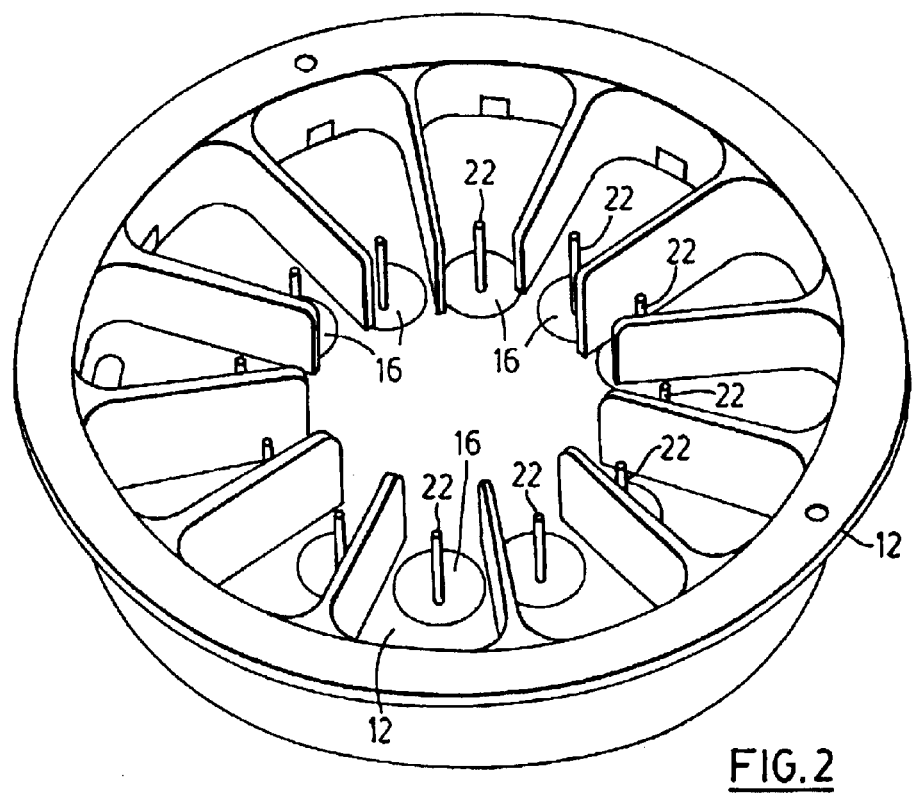
FIG. 2 shows a perspective view of the charge monitor disassembled to reveal the underside of the top layer that is visible in FIG. 1.

The charge monitor of FIG. 1 is mounted on the satellite so that the upper surface of the monitor as shown in FIG. 1 is pointing out into space away from the satellite while the bottom portion of the monitor seen in FIG. 2 is facing the satellite.

FIG. 2 shows the bottom of housing 12 disassembled, and metal charging posts 22 protruding through from the partitioned compartments 13 on the top side of the housing seen in FIG. 1. The metal wires 20 embedded in the dielectric slice 16 that are electrically connected to the probe wires 18 are extended by a short wire that passes through a hole in the base of its metal compartment and connects to an associated metal charging post 22 beneath the housing 12 thereby ensuring each electrical conductor 18 on the top of the housing 12 is electrically connected to an associated charging post 22 on the bottom of the housing 12.

Figure 3:
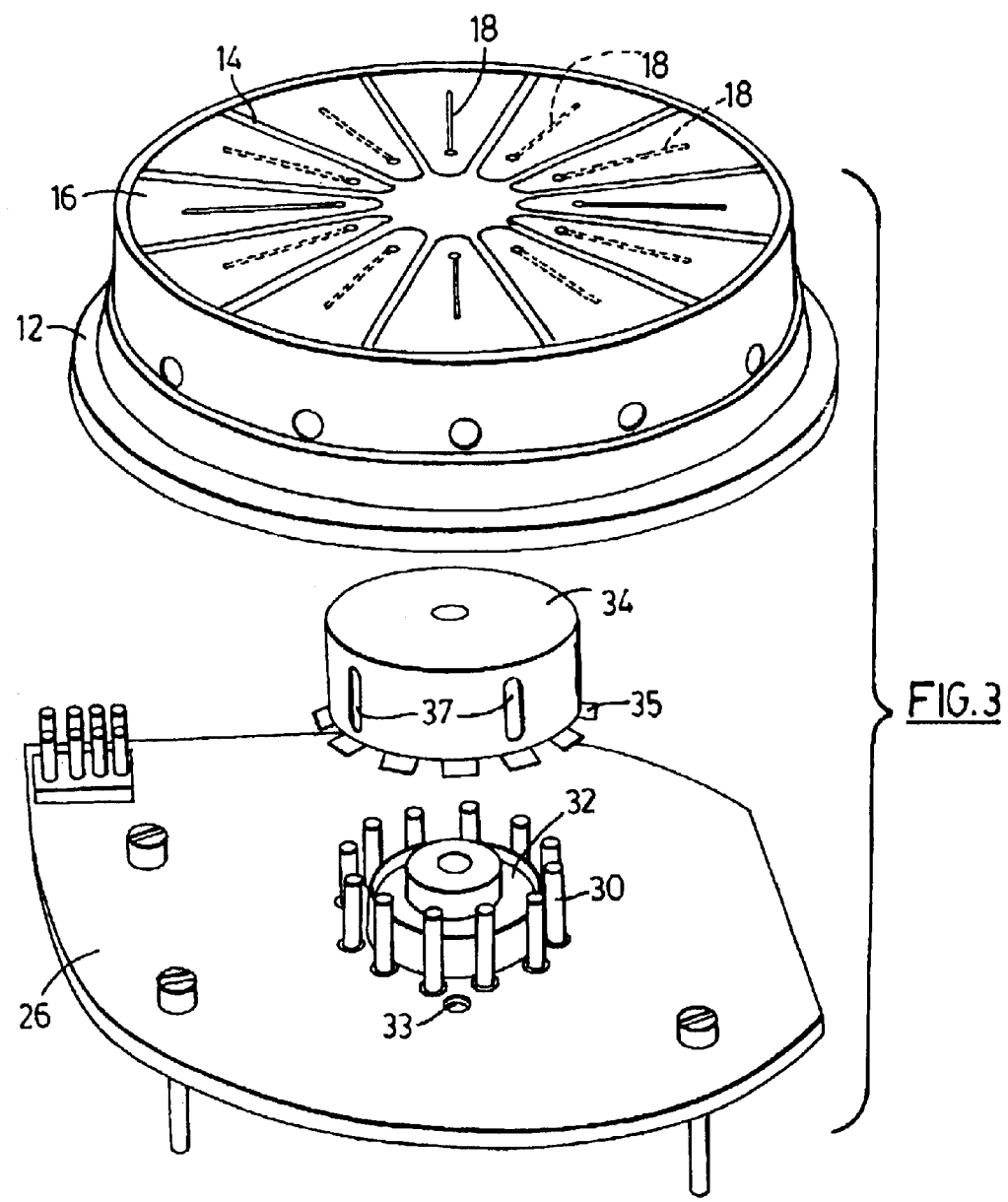
FIG. 3 is an exploded view of part of the charge monitor of FIG. 1, showing the interrupter drum located between the partitioned sample container (above the drum) and the probe array and motor (below the drum)
Figure 4:
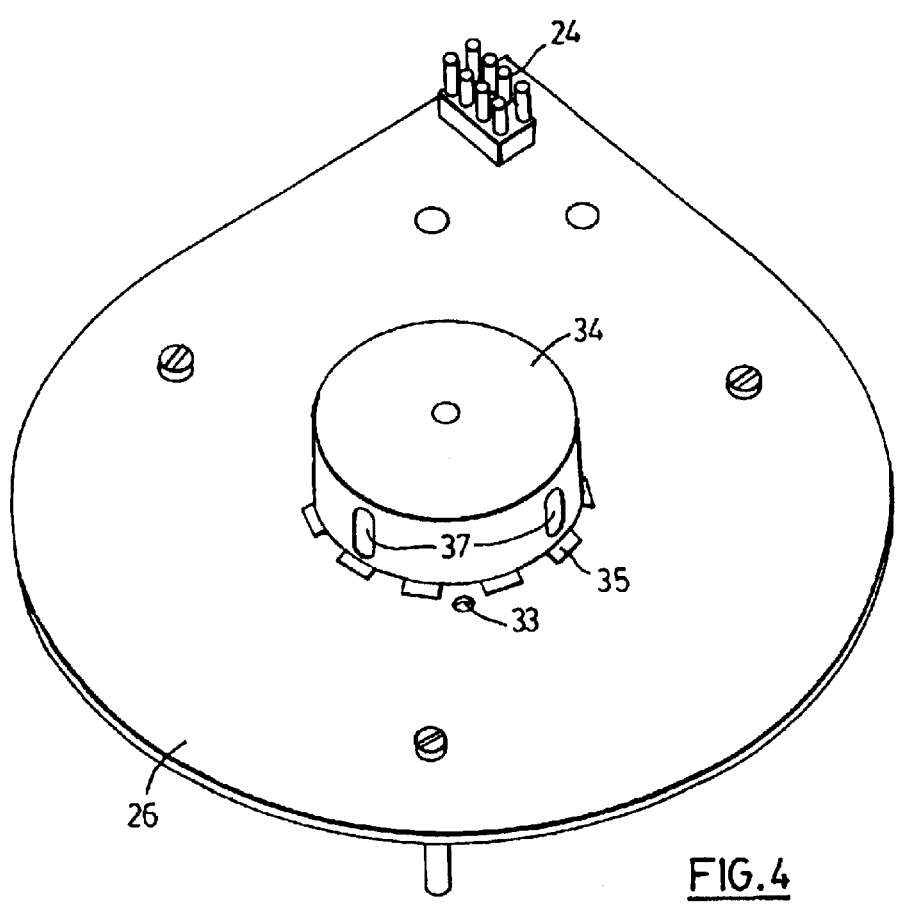
FIG. 4 is a view of the charge monitor similar to FIG. 3 but with the interrupter drum in position.

Referring now to FIGS. 3 and 4, housing 12 includes a base 26 (shown separated from the rest of the housing 12), which includes twelve metal sensing posts 30 arranged in a circle. A motor 32 is mounted for rotation inside the circle defined by the sensing posts 30. Motor 32 rotationally drives a metal drum 34 with the drum having a periodically perforated wall, the open perforations or slots 37 acting as windows so that between the sensing posts 30 and the electrically conductive charging posts 22 is the thin, periodically perforated wall of the rotating metal drum 34. The rim of drum 34 is notched to form tabs 35 which extend outwardly from the drum wall. A hole 33 is located in base 26 and is positioned to be below tabs 35 which periodically cover hole 33 so that a light beam emerging from a light source below base 26 is reflected back to an optical reader 51 (FIG. 6) discussed hereinafter.

Charge monitor 10 is designed to test a number of samples nearly simultaneously, the number being twelve in the monitor 10 shown in the FIG. 1 but it will be understood that there may be more or fewer than twelve dielectric slabs. Each dielectric slab 16 under test is fitted tightly into the pie-segment-shaped metallic-partitioned compartment 13 which is electrically connected to the satellite frame thereby grounding the housing to the satellite. The electrically conductive partitions 14 serve to provide electrical shielding between the compartments so that a charge buildup on one conductor 18 does not affect any charge buildup in any of the other compartments thereby preventing unwanted coupling between wires 18 and its associated charging post 22 with the wires/posts in neighboring compartments 13. Each metallic-partitioned compartment 13 has one side open to the energetic-electron environment of the satellite's orbit in space. Alternatively the open side may be covered with a thin metallic foil that is penetrable only by the higher-energy electrons in the environment. The metallic probe 18 has no low-resistance, direct-current connection either to ground or to the external measurement circuit, so the probe may properly be regarded as electrically isolated or "floating". Thus, due to the energetic-electron environment, the probe acquires an electric potential (a voltage) which may be termed its "floating potential".

Figure 5:
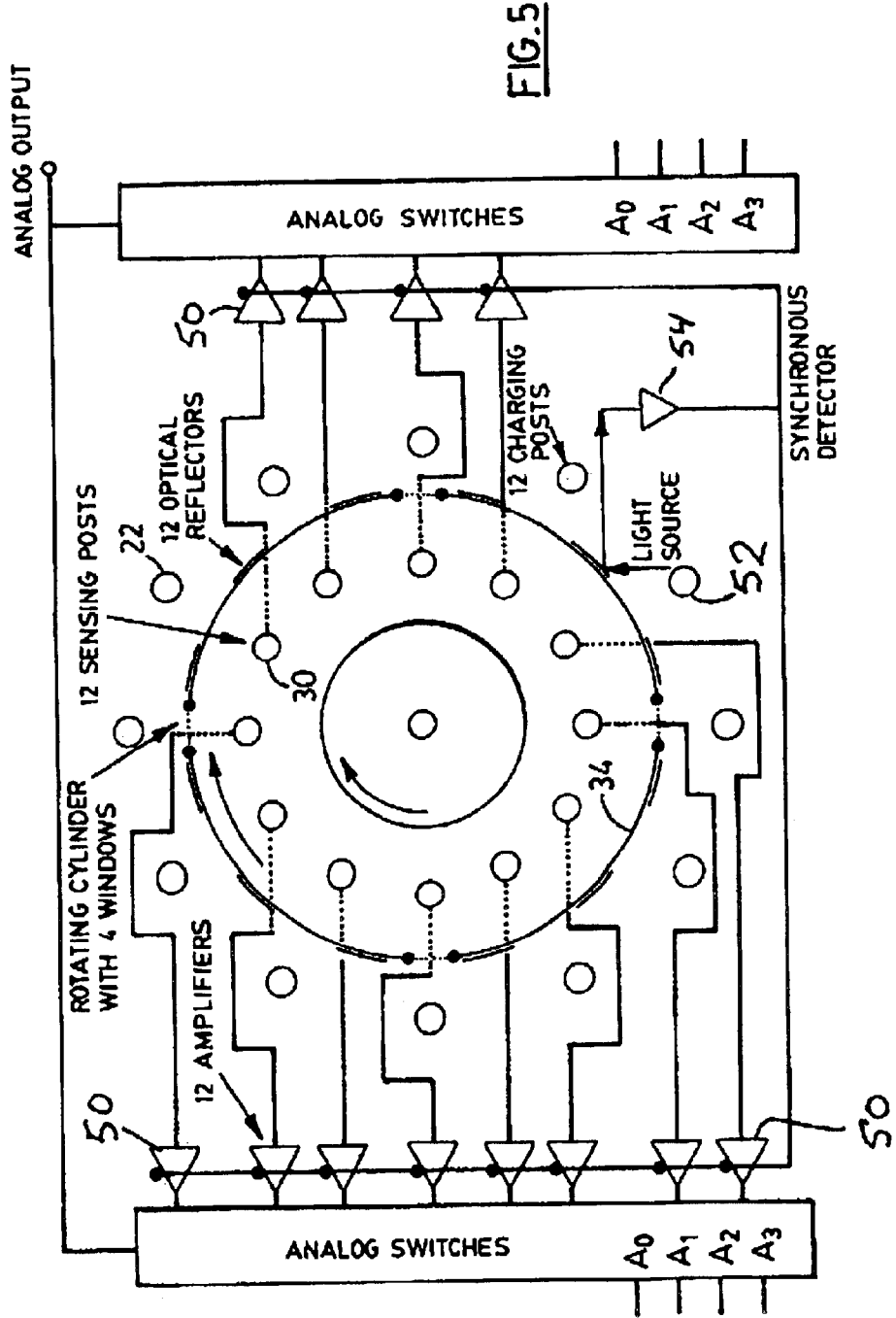
FIG. 5 is a block diagram showing the part of one embodiment that constitutes a device for generating AC voltages from the DC voltages on the sensor wires embedded in the dielectric slices.

Referring to FIG. 5, each electrically conductive sensing post 30 is connected to an operational amplifier 50 which, in turn, provides an amplified signal proportional to the voltage on the sensing post 30. The rotation of drum 34, in effect, opens and closes the windows, thus periodically turning on and off the weak electric field that passes between each charging post and its corresponding sensing post. Thus the steady direct current (DC) voltage on the embedded probe 18 is converted into an alternating voltage (AC) on the sensing post 30.

Figure 6:
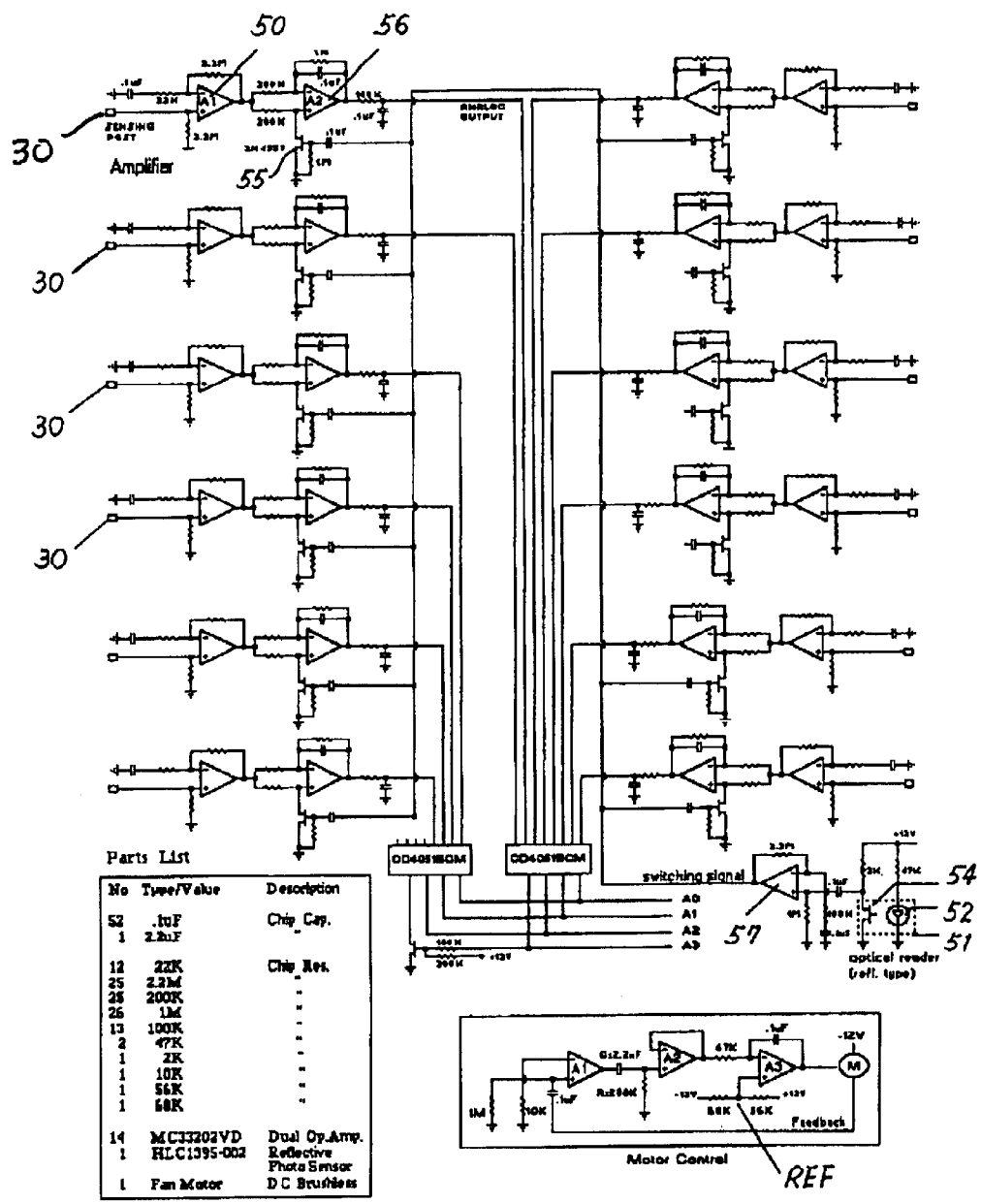
FIG. 6 is a circuit diagram for a 12 channel satellite charge monitor.

The system is synchronized using a light source 52 and light detector 54 shown in FIGS. 5 and 6. FIG. 6 shows an exemplary circuit diagram for a twelve (12) channel charge monitor which would include housing 12 having twelve different compartments with twelve dielectric slabs 16 (FIG. 1) contained therein. The alternating voltage developed on the electrically conductive sensing post 30 is then passed through AC amplifiers 50 and 56 which are inherently much more stable and interference-free than would be the case if only DC voltages were amplified. The alternating signal from the sensing post 30 is passed through the two operational amplifier stages, the first amplifier 50 serving only as an amplifier and the second amplifier 56 functioning as part of a synchronous detector. The switching signal for this synchronous detection process is derived from periodic optical reflections from the rotating drum 34 wherein the periodic optical reflections come from tabs 35 formed by notching a rim around the edge of drum 34. The circuit that achieves this is built around an optical reader package 51 that contains a light-emitting diode 52 which shines light up through hole 33 from below base plate 26 (FIG. 4) with hole 33 positioned to be below tabs 35 which periodically cover hole 33 to permit reflection of light back to the optical reader 51 shown in the broken box in the lower right of FIG. 6.

A light-sensitive photo-transistor 54 which is part of the optical reader package 51 serves as a light detector. The detector signal is then passed through AC amplifier 57. The alternating signal from the optical reader 51 is passed through a 2N4557 FET 55 functioning as a switch whose output turns on and off its associated operational amplifier 56 in synchronism with the opening and closing of the window formed by the slot 37 in the wall of drum 34 between the charging post 22 and the sensing post 30. The coupling between the charging posts 22 and the sensing posts 30 cannot pass DC so differentiation is involved and the unipolar field around the charging post 22 is transformed into a bipolar-pulse signal emerging from the sensing post 30. The electro-mechanical design is such that the associated operational amplifier 56 is "on" only during a unipolar part of the bipolar pulse. Thus the rectified and filtered output of the synchronous detector can be designed to have the same sign as the charging potential that is being measured, so that magnitude calibration is all that is needed in order to complete the measurement. The end result is a recorded steady voltage proportional to the original steady probe floating potential and possessing the needed long-term stability and low noise level. Once functioning, the system can be calibrated by temporarily connecting a known voltage to each charging post through a large-value resistor. The calibration process can also be extended to ensure that no significant voltage is registered on a particular sensing post by a neighboring charging post, a deleterious effect known as "crosstalk". The minimization of crosstalk is of critical importance and is achieved by careful design of three components, 1) the electrically conducting partitions 14 that separate the dielectric slabs above the container base shown in FIG. 1, 2) the same electrically conducting partitions 14 that separate the posts beneath the base shown in FIG. 2 (both points having been discussed above), and 3) the spacing between the windows in the wall of the rotating drum.

The motor control circuit for control of motor 32 is shown in the insert in FIG. 6. The circuit uses an RC network as a frequency-to-DC-voltage converter. The resulting voltage is compared with a reference voltage and the error signal controls the speed of the motor. The motor (M) 32 is a brushless DC type motor with a built-in field generator whose output is an AC signal at the rotational frequency of the motor. This AC voltage is passed through a feedback loop and then through AC amplifier A1. A capacitor C and a resistor R together form a frequency-sensitive network whose output feeds the voltage-follower A2 functioning as a rectifier. Stage A3 is a DC amplifier serving as the motor driver driving the motor at a speed determined by the reference voltage marked "REF" in FIG. 6. Stage A3 is configured as an integrator whose function is to enable rapid system response to any change in motor speed.

Referring again to FIG. 1, a multi-pronged electrical port 24 is used to interface the electronics in monitor 10 to the electronics of the satellite to which the monitor is affixed. More specifically, port 24 has the following lines: two power lines for ±12 volts, ground, analog output, and four digital address lines A0 to A3 seen in FIG. 5.

While the system has been described using a mechanical shutter (perforated drum 34) to generate the AC signal from the DC voltage on the charging posts 20, it will be understood that this AC signal could be achieved with no moving parts using an electronic approach.

Figure 7:
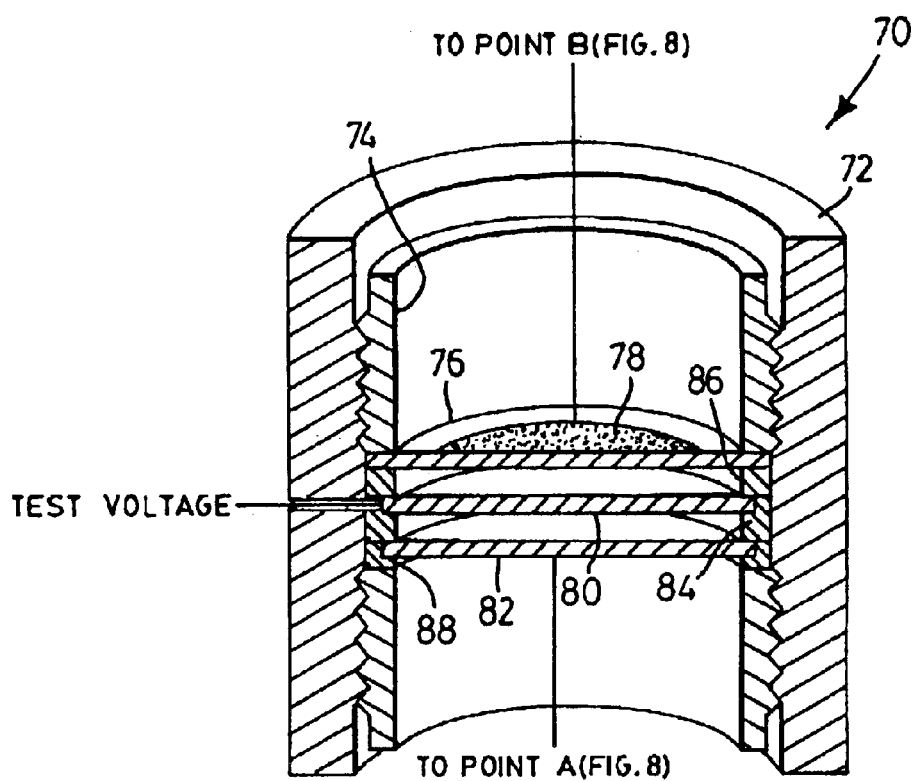
FIG. 7 shows a perspective view, cut-away, of an alternative embodiment of a satellite charge sensor that has no moving parts.

FIG. 7 shows the physical core sensor unit of an alternative embodiment of a charge monitor with no moving parts shown generally at 70. Core unit 70 includes an aluminum outer cylindrical housing 72 which is internally threaded and an inner aluminum cylindrical housing 74 which is threaded on its exterior in order to engage the internal thread on housing 72. A grounded metal disc 76 is mounted in housing 74 and a piezoelectric ceramic driver 78 is mounted on the metal disc or diaphragm 76 in order to vibrate it at a selected frequency. Spaced from metal disc 76 is another metal disc 80 mounted in housing 74 which is electrically floating and is connected to an external test voltage which is generally the floating potential of a probe 18 embedded in a dielectric slab 16 (FIG. 1). A third metal disc 82 spaced from disc 80 mounted in housing 74 provides a signal to an external processor. Metal disc 80 is mounted in a Teflon ring 84 to insulate it from housing 74 and is spaced from metal disc 76 by a Teflon ring 86. Metal disc 82 is mounted in a Teflon ring 88 to insulate it from housing 74 while at the same time being spaced from disc 80 by Teflon ring 84.

Figure 8:
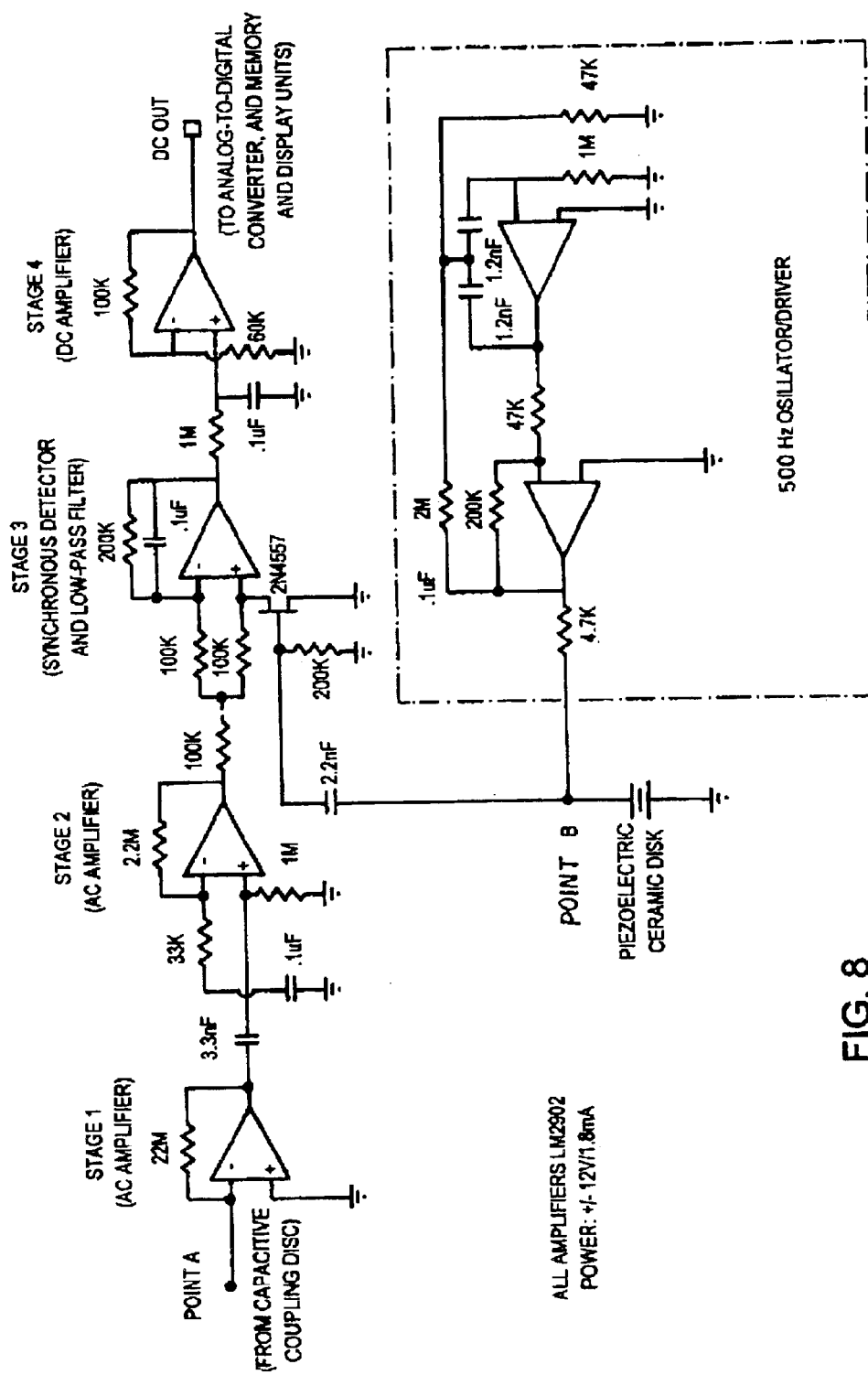
FIG. 8 is a schematic circuit diagram of the electronic driver/processor detector circuit that drives the piezoelectric ceramic vibrator in the satellite charge monitor of FIG. 7 and measures the floating potential induced in the electrode contained in the dielectric slab.
Figure 9:
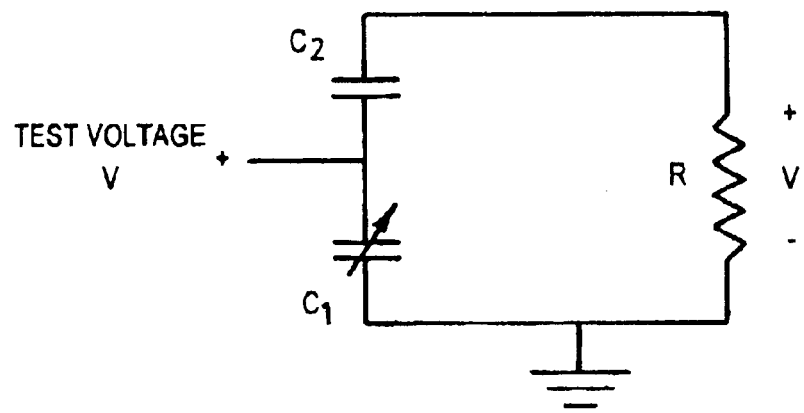
FIG. 9 is a schematic diagram showing the various system capacitances in the satellite charge monitor of FIG. 7.

FIG. 8 is a circuit diagram of the electronic driver/processor that drives the piezoelectric ceramic driver 78 in housing 74 and processes the output signal from the core unit by means of a synchronous detection function leading to an analog DC output proportional to the floating test voltage input. FIG. 9 is an electrical schematic diagram showing the various system components. $C_1$ is the steady part of the oscillating capacitance between the vibrating diaphragm 76 and the metal disc 80 connected to the test voltage of the floating probe, and $C_2$ is the coupling capacitance leading to the driver/processor unit. V is the steady floating potential of the wire probe embedded in the dielectric slab under test, R is the input resistance of the first-stage operational amplifier in the driver/processor, and v is the oscillating voltage at the driver/processor input.

Charge monitor 70 of FIG. 7 measures the electrical floating potential of a metallic probe 18 embedded in a sample of dielectric material 16 shown in FIG. 1. This represents configurations such as the inner conductor of a coaxial cable or a metallic trace on a printed-circuit board, where the metal has become charged as a consequence of environmental conditions such as the presence of a beam of energetic electrons in space (the Van Allen belt environment of a communication satellite) or friction between dissimilar materials (triboelectric charging).

The metallic probe 18 (FIG. 1) is connected to the "Test Voltage" point in FIG. 7 which in turn connects to the electrically floating metallic disc 80 sandwiched between the 500 Hz vibrating piezoelectric-driven metal disc 76 above it and the capacitively-coupled signal-pickup disc 82 located below it in FIG. 7. The vibrating disc 76 (driven by the piezoelectric 78 connected to an oscillator circuit at Point B in FIG. 8) produces an oscillating capacitance to the middle, charged disc 80, which then induces an oscillating charge on the lower signal-pickup disc 82, resulting in a 500 Hz oscillating current injected into the signal-processing unit at Point A in the circuit of FIG. 8.

Referring again to the circuit diagram in FIG. 8, the oscillating signal at Point A passes through two stages (Stage 1 and Stage 2) of AC amplification to Stage 3 which provides synchronous detection. The amplifier function of Stage 3 is turned on and off at half-cycle intervals as a consequence of the half-wave rectifier function of the 2N4557 FET operating on a fraction of the 500 Hz oscillator/driver signal, the other fraction driving the piezoelectric vibrator. The half-wave-rectified signal is filtered through two R-C circuits to remove ripple and is then passed via the DC amplification of Stage 4 to the DC output connector where the DC signal is proportional to the original DC voltage on the probe embedded in the dielectric slab. At this point, the DC output is then ready for conversion to a digital signal for transmission to other units for data storage, retrieval and display.

With reference to FIG. 9, circuit analysis shows that the oscillating voltage v provided to the first operational amplifier stage of the driver/processor unit is given approximately by:

$$v = -j\omega R C_2 V c_1 [C_1(1+j\omega R C_2) + C_2]^{-1}$$

where v is the oscillating voltage input to the processor, using complex/phasor notation, $\omega$ is the radian frequency of the piezoelectric driver, R is the input resistance of the processor first stage, $C_2$ is the capacitance of the coupling capacitor, V is the steady voltage induced on the dielectric-embedded wire probe, $c_1$ is the oscillating part of the capacitance $C_1$, driven at frequency $\omega$, $C_1$ is the steady part of the driven capacitance. Note that the normally small capacitance of the embedded thin-wire probe is assumed to be negligible in the above, but it could be included in the analysis if necessary.

For circuit values as follows: $C_1=1$ pF, $C_2=1$ pF, $c_1=0.01$ pF peak, R=20 MΩ (shunted by approximately 3 pF), operating frequency f=$\omega/2\pi$ in the range 300–600 Hz, the resonant frequency of the piezoelectric disc is approximately 4 kHz (note that operation well below this frequency reduces undesirable system sensitivity to interference and temperature variations).

A test voltage V of 100 volts produced v=1.5 millivolts peak. This not only demonstrates system feasibility by providing sufficient signal for subsequent processing, but also it demonstrates system calibration.

Figure 10:
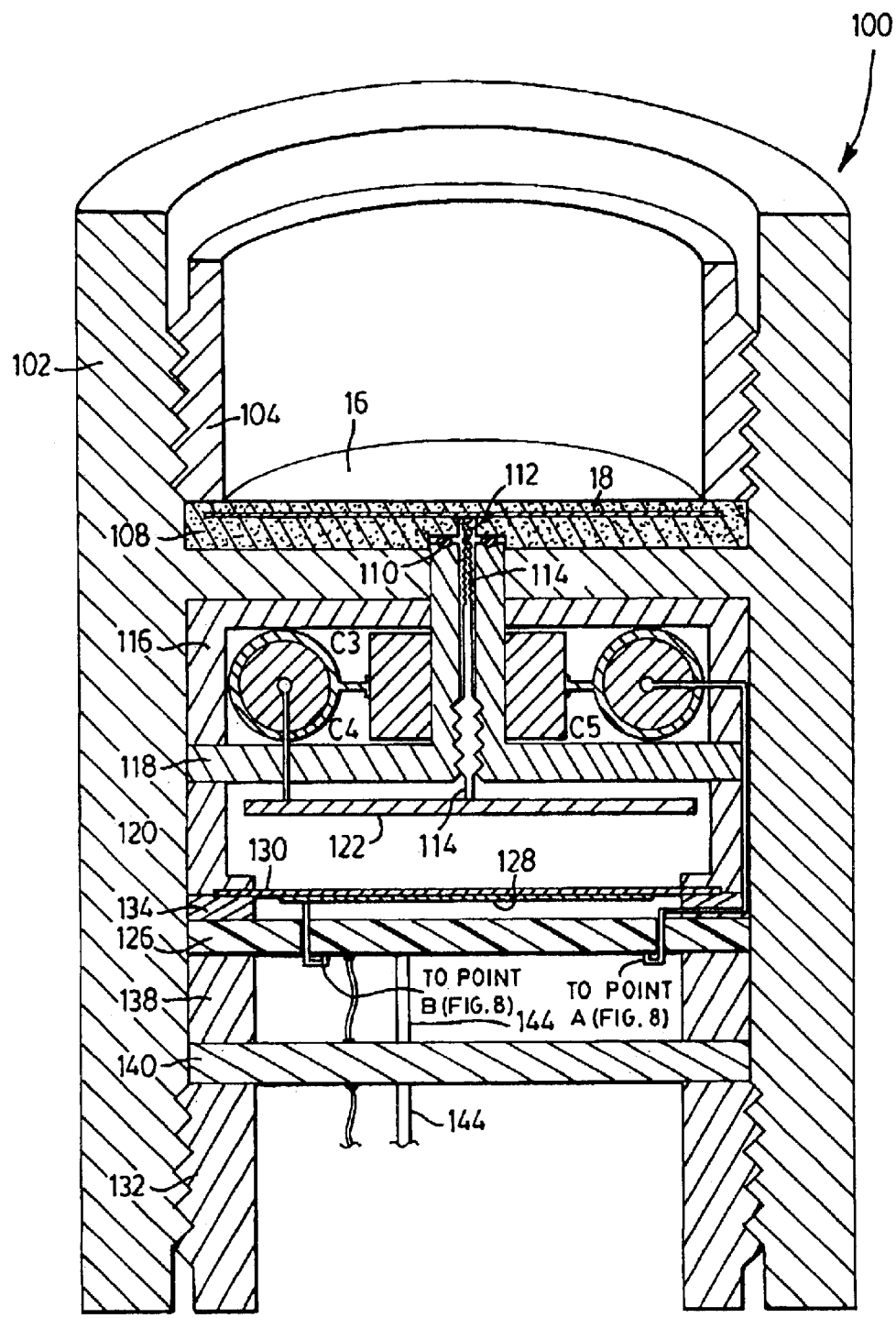
FIG. 10 is a cross sectional view of an alternative embodiment of an integrated charge monitor that incorporates the functions of the charge monitor embodiments of FIGS. 7, 8, and 9, along with a single test cell and embedded probe generally of the embodiment of a charge monitor shown in FIG. 1.

FIG. 10 shows an integrated charge monitor unit 100 that may be operated in a laboratory vacuum chamber or mounted on a spacecraft. It combines the functions of the core unit in FIG. 7, the electronic driver/processor in FIG. 8, and, as seen in FIG. 1, one of the dielectric samples 16 with its embedded metallic probe 18. Charge monitor 100 provides a compact monitor which measures the voltage on a single electrode 18. With reference specifically to FIG. 10, the entire charge monitor device 100 is contained within a cylindrical aluminum housing 102. A cylindrical aluminum screw 104 holds in place metallic probe 18 embedded in a dielectric slab 16. To ensure against residual-gas breakdown, an elastomer O-ring 110 seals a potential breakdown path defined through the channel that carries an electrically conducting rod 114 which guides a metal spring 112 from probe 18 through dielectric slab 16.

Figure 11:
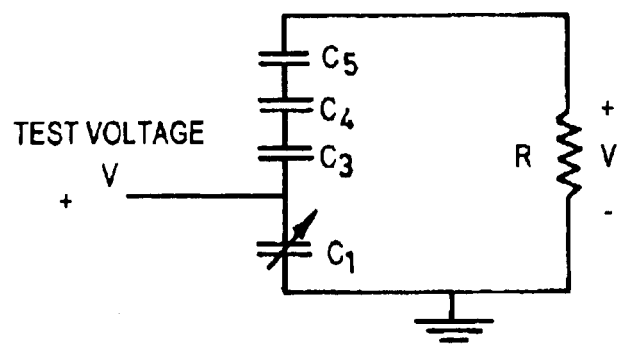
FIG. 11 is a schematic diagram showing the various system capacitances in the satellite charge monitor of FIG. 10.

In order to make electrical contact with the metallic probe 18, a pressure contact is maintained via the metal spring 112 that presses directly against the probe 18. Metal spring 112 is mounted over and concentric with metal conductor rod 114 which is shown threaded into an insulating Teflon web 118. Because the probe 18 can charge to a floating potential of around 15 kV, everything connected to the probe 18 must be contained in a Teflon insulating chamber defined by 116, 118 and 120. An electrically floating metal disc 122 is connected to the probe 18 through the pressure contact of spring 112 bearing against probe 18 which is electrically contacting metal rod 114 which is connected to metal disc 122, and this disc 122 is also connected to three identical 80 pF high-voltage (10 kV each) capacitors C3, C4 (partially hidden from view) and C5, which together perform the function of C2 in FIG. 9 as illustrated in FIG. 11, while ensuring a sufficiently high end-to-end voltage rating of 30 kV to protect against the expected maximum floating potential of 15 kV with a considerable safety margin. A circuit board 126 is mounted in housing 102 which contains the amplification and detection circuit shown in FIG. 8. Capacitor C5 is then electrically connected to circuit board 126 at the point "A" in the circuit of FIG. 8. A grounded metal disc 130 supports a piezoelectric vibrator 128, so that the capacitance between disc 130 and disc 122 oscillates, thus functioning as the oscillatory capacitance C1 in FIG. 11 (same as C1 in FIG. 9). In FIG. 10, a cylindrical aluminum screw 132 holds in place the aluminum spacer 134, the circuit board 126, the aluminum spacer 138, and the connector board 140 to which electrical connection is made to provide power to circuit board 126 and which also includes a data bus 144 for transmitting voltage data from the charge monitor representative of the voltage buildup on the electrical conductor 18 to the satellite communication system. A connection between the piezoelectric vibrator 128 and the circuit board 126 is shown, the circuit connection point being the one labeled "B" in FIG. 8. FIG. 11 is a schematic diagram showing the various system capacitances in the satellite charge monitor of FIG. 10.

Several charge monitor sensor units 100 may be placed in close proximity to each other with each individual unit 100 having its dielectric slabs aligned with the dielectric slabs in the other sensor units but with each having its electrical probe 18 located at a different depth in its associated dielectric slab relative to the other units 100 to provide the depth profile of charge buildup local to that part of the satellite similar to the depth profile obtained with the charge monitor 10 of FIG. 1. A pre-selected number of units 100 may be pre-assembled together as a sensor array and affixed as a unit to the satellite.

Typical commercial instruments are designed for the measurement of potentials at various points a short distance above a charged surface, generally for the purpose of creating a map of the surface potential distribution, by scanning the surface potential probe back and forth over the surface to acquire the needed data. Such a probe scanning procedure must not disturb the overall charge distribution (hence potential distribution) as the probe is moved, so at each measurement point the potential of the entire probe system has to be automatically adjusted to be equal to the potential being measured. This requires a complex and costly control system, and it also creates situations of significant danger due to the high voltages involved. For example, the probe can be measuring a potential of many kilovolts as it approaches grounded metal. The result is a probe-to-ground arc discharge that destroys the probe, its control circuits and the data in memory within nearby computers. While widely used for relevant laboratory research, such a probing technique is clearly not suitable for assessing the charging threat on a satellite, where reliability, cost, weight, size and power consumption are crucial. The problematic nature of measuring potentially very high voltages in space applications also means that it is not practical to have more than one electrical probe embedded in each dielectric slab. The inventors have discovered that having more than one electrical probe in the same dielectric slab which must be relatively small in surface area in a compact design greatly deceases the chance of getting a true reading at the particular depth of each wire due to interference and cross talk from the other wires in the same dielectric slab albeit they may be spaced from each other. Thus, in a compact design of a charge monitor as disclosed herein it is preferable to have only one probe per slab.

Existing commercial probes typically employ a metal box with a hole in one of its walls, with the hole positioned just over and close to the surface whose potential is to be measured. A metallic vane within the box is by some means mechanically driven to wag back and forth over the hole in the presence of such electric field that manages to leak through the hole, thus generating an AC signal in the wire connected to the vane. The control system then adjusts the potential of the box and everything in it to minimize the AC signal, thus making the box potential identical to the surface potential being measured.

In the present application of assessing the charging threat by measuring individually the floating potentials on an array of metallic probes embedded in samples of dielectric materials, once this guiding principle has been established, everything depends on the details of the technique to be implemented. Since the probes are small and electrically isolated, the charge on each probe is largely immobile and cannot be moved around by the process of making a measurement of its floating potential or that of its neighbors. Thus the wagging-vane process of generating an AC signal together with minimizing it using a complex control system seems unnecessary. Instead, the present inventors have developed different techniques to generate the AC signal, and then used its proportionality to the probe floating potential together with calibration in order to complete the measurement processes.

As used herein, the terms "comprises", "comprising", "including" and "includes" are to be construed as being inclusive and open ended, and not exclusive. Specifically, when used in this specification including claims, the terms "comprises" and "comprising" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. A charge monitor for satellites, comprising:
   a) an electrically conducting housing including at least two compartments with said at least two compartments each including a dielectric slab contained therein, each dielectric slab having a selected thickness;
   b) an electrically conducting electrode embedded in each dielectric slab a pre-selected distance below a top surface of the dielectric slab, said housing being mountable on a satellite with said top surface of said dielectric slab facing outwardly into space away from said satellite whereby charged particles emitted from sources external to the satellite penetrate said dielectric slab resulting in charge accumulation in each electrically conducting electrode producing a floating DC voltage on said electrically conducting electrode, each electrically conducting electrode being electrically isolated from all other electrically conducting electrodes in said electrically conducting housing; and
   c) detection means for sensing of the floating DC voltage developed on the electrically conducting electrode embedded in each dielectric slab, due to the charge accumulation, and converting the floating DC voltage into an AC voltage representative of a charge buildup on each electrically conducting electrode.

2. The charge monitor according to claim 1 wherein said at least two compartments is two or more compartments which are arranged side-by-side for measuring charge build-up over a pre-selected surface area, and wherein the electrically conducting electrodes are embedded at different depths for measuring charge build-up at the different depths in the dielectric slabs.

3. The charge monitor according to claim 2 wherein the dielectric slab in each compartment contains a dielectric slab made of a dielectric material different from the dielectric slabs in the other compartments with each dielectric material corresponding to a dielectric component of a satellite.

4. The charge monitor according to claim 3 wherein said dielectric material from which said dielectric slabs are produced is selected from the group consisting of Mylar, Kapton, Rexolite, Kevlar, Teflon, acrylic, ceramic, fiberglass, and composites thereof.

5. The charge monitor according to claim 1 wherein said detection means includes a number of electrically conducting sensing posts equal to a number of said electrically conductive electrodes, said electrically conducting sensing posts being arranged in a circle, including a cylindrical electrically conductive housing having a pre-selected number of slots in a side wall thereof being mounted with said electrically conducting sensing posts being located within said cylindrical electrically conductive housing, said cylindrical electrically conductive housing being connected to a motor for rotation about a cylindrical axis of said cylindrical electrically conductive housing, and wherein said detection means includes a number of electrically conducting charging posts equal to the number of said electrically conductive electrodes, each of said electrically conducting electrodes being connected to an associated electrically conducting charging post, the electrically conducting charging posts being arranged in a circle on the outside of said cylindrical electrically conductive housing and concentric with the circle of the electrically conductive sensing posts so that each electrically conductive sensing post is in opposing relationship to an associated electrically conducting charging post, said detection means including a voltage measuring means connected to each electrically conducting sensing post, wherein as said cylindrical electrically conductive housing rotates, each time a slot is rotated into a position between an electrically conducting sensing post and its associated electrically conducting charging post, an electric field is established therebetween and the voltage induced on said electrically conducting sensing post from the floating DC voltage on the electrically conducting charging post is measured, and wherein rotating said slot into, and out of, the position between said electrically conducting sensing post and its associated electrically conducting charging post periodically turns on, and off, the electric field that passes therebetween thereby converting the floating DC voltage on the electrically conducting electrode embedded in the dielectric slab into an alternating voltage on the electrically conducting sensing post.

6. The charge monitor according to claim 5 wherein said voltage measuring means includes an amplifier means connected to each of said electrically conducting sensing post for providing an amplified voltage signal proportional to the alternating voltage on the electrically conducting sensing post.

7. The charge monitor according to claim 6 wherein each amplifier means includes two operational amplifier stages, a first operational amplifier stage through which the alternating signal from the electrically conducting sensing post is passed to amplify the alternating signal, and a second operational amplifier stage functioning as a synchronous detector, and wherein said cylindrical electrically conductive housing includes a peripheral notched rim, including an optical reader circuit mounted in said electrically conducting housing and including a light source and light detector means, said light source and detection means being positioned so that light from said light source is periodically reflected from said peripheral notched rim and detected by said detection means producing an alternating optical signal, said alternating optical signal being passed through a rectifier means whose output turns on and off an associated operational amplifier in synchronism with one of the slot being rotated into, and out of, the position between the electrically conducting sensing post and its associated electrically conducting charging post.

8. The charge monitor according to claim 7 wherein the direct current (DC) voltage on the electrically conducting charging post produces a unipolar electric field around the electrically conductive charging post which is transformed into said AC voltage which is a bipolar-pulse signal emerging from the electrically conducting sensing post, and wherein each second operational amplifier stage functioning as a synchronous detector is "on" only during a unipolar part of the bipolar pulse signal so that a rectified and filtered output voltage of the second operational amplifier stage is configured to have the same sign as the charging potential that is being measured.

9. The charge monitor according to claim 5 wherein said dielectric slabs are spaced sufficiently far enough from each other, said electrically conducting charging posts are spaced sufficiently far enough from each other and said slots are spaced sufficiently far enough from each other in the wall of said cylindrical electrically conductive housing to reduce electrical interference of a measurement of a voltage induced on one of said electrically conducting sensing posts from measurements of voltages on the other electrically conducting sensing posts being simultaneously measured through the other slots.

10. The charge monitor according to claim 5 wherein said at least two compartments is greater than two compartments which are arranged side-by-side for measuring charge build-up over a pre-selected surface area, and wherein the electrically conducting electrodes are embedded at different depths for measuring charge build-up at the different depths in the dielectric slabs.

11. The charge monitor according to claim 10 wherein each compartment contains a dielectric slab made of a dielectric material different from the dielectric slabs in the other compartments with each dielectric material corresponding to a dielectric component of a satellite.

12. The charge monitor according to claim 11 wherein said dielectric material from which said dielectric slabs are produced is selected from the group consisting of Mylar, Kapton, Rexolite, Kevlar, Teflon, acrylic, ceramics, fiberglass, and composites thereof.

13. The charge monitor according to claim 1 wherein said detection means comprises a pre-selected number of transducers equal to the number of said electrically conducting electrodes, each transducer including a first metallic diaphragm electrically connected to an associated electrically conducting electrode, a second metallic diaphragm spaced from said first metallic diaphragm and substantially parallel thereto on one side of said first metallic diaphragm, a means for vibrating said second metallic diaphragm at a pre-selected frequency, and a third metallic diaphragm located on the other side of said first metallic diaphragm and substantially parallel thereto, said first metallic diaphragm being electrically insulated so that it acquires the floating voltage potential developed on the electrically conducting electrode to which it is attached, said detection means including an oscillator circuit connected to said vibration means and a synchronous detection circuit electrically connected to said third metallic diaphragm, wherein vibrating said second metallic diaphragm at said pre-selected frequency produces an oscillating capacitance to the first metallic diaphragm which then induces an oscillating charge on said third metallic diaphragm, resulting in an oscillating current at said pre-selected frequency being injected into the synchronous detection circuit which converts said oscillating current into a DC voltage proportional to the floating DC voltage on the electrically conducting electrode.

14. The charge monitor according to claim 13 wherein said at least two dielectric slabs is a plurality of dielectric slabs arranged in a plane, wherein said electrically conducting electrodes embedded in each dielectric slab are elongate wires disposed parallel to the top surface of the slabs in which they are embedded, wherein said elongate wires are embedded at different depths in their respective dielectric slabs to allow monitoring at those depths of the potentials due to charge accumulation.

15. The charge monitor according to claim 13 wherein said detection means includes amplifier means through which said oscillating current passes, said amplifier means being connected to said synchronous detection circuit, said synchronous detection including an amplifier turned on and off at half-cycle intervals as a consequence of a half-wave rectifier means operating on a fraction of the oscillator circuit signal and wherein another fraction of the oscillator circuit signal drives the vibration means, and wherein a half-wave-rectified signal is filtered through a filter means to remove ripple and is then passed to a DC amplifier means the output of which is the DC voltage signal proportional to the floating DC voltage on the electrically conducting electrode.

16. The charge monitor according to claim 15 wherein said vibration means is a piezoelectric crystal bonded to said second metallic diaphragm.

17. The charge monitor according to claim 15 including voltage digitization means for converting said DC voltage signal to a digital signal, and data storage, retrieval and transmission means for storing, retrieving and transmitting said digital signal.

18. The charge monitor according to claim 13 wherein each compartment contains a dielectric slab made of a dielectric material different from the dielectric slabs in the other compartments with each dielectric material corresponding to a dielectric component of a satellite.

19. The charge monitor according to claim 18 wherein said dielectric material from which said dielectric slabs are produced is selected from the group consisting of Mylar, Kapton, Rexolite, Kevlar, Teflon, acrylic, ceramic, fiberglass, and composites thereof.

20. A charge monitor for satellites, comprising:

a sensor array including at least one sensor unit with the sensor array being attachable to a satellite;

said at least one sensor unit including a) an electrically conducting housing defining a compartment containing a dielectric slab therein, said dielectric slab having a selected thickness, the electrically conductive housing being attachable to a satellite;

b) an electrically conducting electrode embedded in said dielectric slab a pre-selected distance below a top surface of the dielectric slab, said housing being mountable on a satellite with said top surface of said dielectric slab facing outwardly into space away from said satellite whereby charged particles emitted from sources external to the satellite penetrate said dielectric slab resulting in charge accumulation in the electrically conducting electrode to produce a floating DC voltage, and c) detection means for sensing the floating DC voltage developed on the electrically conducting electrode in said dielectric slab, due to the charge accumulation, and converting the floating DC voltage into an AC voltage representative of a charge buildup on said electrically conducting electrode.

21. The charge monitor according to claim 20 wherein said at least one sensor unit is two or more sensor units pre-positioned with respect to each other.

22. The charge monitor according to claim 20 wherein said detection means includes a synchronous detection circuit, a first metallic diaphragm electrically connected to said electrically conducting electrode so that it acquires the floating DC voltage potential developed on the electrically conducting electrode to which it is attached, an electrically grounded second metallic diaphragm spaced from said first metallic diaphragm and substantially parallel thereto, vibration means for vibrating said second metallic diaphragm at a pre-selected frequency to oscillate a capacitance between said first and second metallic diaphragms, said first metallic diaphragm being capacitively coupled to said synchronous detection circuit wherein said oscillating capacitance induces an oscillating charge on said first metallic diaphragm, resulting in an oscillating current at said pre-selected frequency being injected into the synchronous detection circuit, and wherein said synchronous detection circuit converts said oscillating capacitance to a steady state voltage output indicative of the floating DC voltage buildup on the electrically conducting electrode.

23. The charge monitor according to claim 22 wherein said detection means includes an oscillator circuit connected to said vibration means for oscillating said vibration means at said pre-selected frequency, said oscillator circuit being connected to said synchronous detection circuit, and wherein said detection means includes an amplifier means through which said oscillating current passes, said amplifier means being connected to said synchronous detection circuit, said synchronous detection means including an amplifier turned on and off at half-cycle intervals as a consequence of a half-wave rectifier means operating on a fraction of the oscillator circuit signal and wherein another fraction of the oscillator circuit signal drives the vibration means, and wherein a half-wave-rectified signal is filtered through a filter means to remove ripple and is then passed to a DC amplifier means the output of which is the DC voltage signal proportional to the original DC voltage induced in the electrically conducting electrode embedded in the dielectric slab.

24. The charge monitor according to claim 23 wherein said vibration means is a piezoelectric crystal bonded to said second metallic diaphragm.

25. The charge monitor according to claim 23 including a voltage digitization means for converting said DC voltage signal to a digital signal, and data storage, retrieval and transmission means for storing, retrieving and transmitting said digital signal.

26. The charge monitor according to claim 21 wherein each sensor unit contains a dielectric slab made of a dielectric material different from the dielectric slabs in the other compartments with each dielectric material corresponding to a dielectric component of a satellite.

27. The charge monitor according to claim 26 wherein said dielectric material from which said dielectric slabs are produced is selected from the group consisting of Mylar, Kapton, Rexolite, Kevlar, Teflon, acrylic, ceramic, fiberglass, and composites thereof.

28. The charge monitor according to claim 20 wherein said first metallic diaphragm is capacitively coupled to said synchronous detection circuit using at least one capacitor having a sufficiently high voltage rating to protect against an expected maximum floating potential of at least about 15 kV.

29. The charge monitor according to claim 28 wherein said at least one capacitor is three capacitors electrically connected in series with an end-to-end voltage rating of about 30 kV.

30. The charge monitor according to claim 21 wherein said at least two sensor units are arranged side-by-side for measuring charge build-up over a pre-selected surface area, and wherein the electrically conducting electrodes are embedded at different depths in their respective dielectric slabs for measuring charge build-up at the different depths in the dielectric slabs.

31. A satellite, comprising:
a) a satellite housing containing a power supply and a satellite payload including communication means for communicating with a satellite control center;
b) a charge monitor including
an electrically conducting housing including at least two compartments with said at least two compartments each including a dielectric slab contained therein, each dielectric slab having a selected thickness, an electrically conducting electrode embedded in each dielectric slab a pre-selected distance below a top surface of the dielectric slab, said housing being mounted on said satellite housing with said top surface of said dielectric slab facing outwardly into space away from said satellite whereby charged particles emitted from sources external to the satellite penetrate said dielectric slab resulting in charge accumulation in each electrically conducting electrode producing a floating DC voltage on each electrically conducting electrode, each electrically conducting electrode being electrically isolated from all other electrically conducting electrodes in said electrically conducting housing; and
detection means for sensing of the floating DC voltage developed on the electrically conducting electrode embedded in each dielectric slab, due to the charge accumulation, and converting the floating DC voltage into an AC voltage representative of a charge buildup on each electrically conducting electrode,
said charge monitor being connected to said communication means for communicating charge build-up data to the satellite control center.

32. The satellite according to claim 31 wherein said at least two compartments is greater than two compartments which are arranged side-by-side for measuring charge build-up over a pre-selected surface area, and wherein the electrically conducting electrodes are embedded at different depths for measuring charge build-up at the different depths in the dielectric slabs.

33. The satellite according to claim 31 wherein said detection means includes a number of electrically conducting sensing posts equal to a number of said electrically conductive electrodes, said electrically conducting sensing posts being arranged in a circle, including a cylindrical electrically conductive housing having a pre-selected number of slots in a side wall thereof being mounted with said electrically conducting sensing posts being located within said cylindrical electrically conductive housing, said cylindrical electrically conductive housing being connected to a motor for rotation about a cylindrical axis of said cylindrical electrically conductive housing, and wherein said detection means includes a number of electrically conducting charging posts equal to the number of said electrically conductive electrodes, each of said electrically conducting electrodes being connected to an associated electrically conducting charging post, the electrically conducting charging posts being arranged in a circle on the outside of said cylindrical electrically conductive housing and concentric with the circle of the electrically conductive sensing posts so that each electrically conductive sensing post is in opposing relationship to an associated electrically conducting charging post, said detection means including a voltage measuring means connected to each electrically conducting sensing post, wherein as said cylindrical electrically conductive housing rotates, each time a slot is rotated into a position between an electrically conducting sensing post and its associated electrically conducting charging post, an electric field is established therebetween and the voltage induced on said electrically conducting sensing post from the floating DC voltage on the electrically conducting charging post is measured, and wherein rotating said slot into, and out of, the position between said electrically conducting sensing post and its associated electrically conducting charging post periodically turns on, and off, the electric field that passes therebetween thereby converting the floating DC voltage on the electrically conducting electrode embedded in the dielectric slab into an alternating voltage on the electrically conducting sensing post.

34. The satellite according to claim 33 wherein said voltage measuring means includes an amplifier means connected to each of said electrically conducting sensing post for providing an amplified voltage signal proportional to the alternating voltage on the electrically conducting sensing post.

35. The satellite according to claim 34 wherein each amplifier means includes two operational amplifier stages, a first operational amplifier stage through which the alternating signal from the electrically conducting sensing post is passed to amplify the alternating signal, and a second operational amplifier stage functioning as a synchronous detector, and wherein said cylindrical electrically conductive housing includes a peripheral notched rim, including an optical reader circuit mounted in said electrically conducting housing and including a light source and light detector means, said light source and detection means being positioned so that light from said light source is periodically reflected from said peripheral notched rim and detected by said detection means producing an alternating optical signal, said alternating optical signal being passed through a rectifier means whose output turns on and off an associated operational amplifier in synchronism with one of the slot being rotated into, and out of, the position between the electrically conducting sensing post and its associated electrically conducting charging post.

36. The satellite according to claim 35 wherein the direct current (DC) voltage on the electrically conducting charging post produces a unipolar electric field around the electrically conducting sensing post which is transformed into said AC voltage which is a bipolar-pulse signal emerging from the electrically conducting sensing post, and wherein each second operational amplifier stage functioning as a synchronous detector is "on" only during a unipolar part of the bipolar pulse signal so that a rectified and filtered output voltage of the second operational amplifier stage is configured to have the same sign as the charging potential that is being measured.

37. The satellite according to claim 33 wherein said dielectric slabs are spaced sufficiently far enough from each other, said electrically conducting charging posts are spaced sufficiently far enough from each other and said slots are spaced sufficiently far enough from each other in the side wall of said cylindrical electrically conductive housing to reduce electrical interference of a measurement of a voltage induced on one of said electrically conducting sensing posts from measurements of voltages on the other electrically conducting sensing posts being simultaneously measured through the other slots.

38. The charge monitor according to claim 36 wherein each compartment contains a dielectric slab made of a dielectric material different from the dielectric slabs in the other compartments with each dielectric material corresponding to a dielectric component of a satellite.

39. The satellite according to claim 38 wherein a material from which said dielectric slabs are produced is selected from the group consisting of Mylar, Kapton, Rexolite, Kevlar, Teflon, acrylic, ceramic, fiberglass, and composites thereof.

40. A satellite, comprising:

a satellite housing containing a power supply, satellite payload including communication means for communicating with a satellite control center; and a charge monitor including a sensor array including at least one sensor unit with the sensor array being attached to the satellite housing, said at least one sensor unit including a) an electrically conducting housing defining a compartment containing a dielectric slab therein, said dielectric slab having a selected thickness, the electrically conductive housing being attachable to a satellite;

b) an electrically conducting electrode embedded in said dielectric slab a pre-selected distance below a top surface of the dielectric slab, said housing being mountable on a satellite with said top surface of said dielectric slab facing outwardly into space away from said satellite whereby charged particles emitted from sources external to the satellite penetrate said dielectric slab resulting in charge accumulation in the electrically conducting electrode to produce a floating DC voltage, and c) detection means for sensing the floating DC voltage developed on the electrically conducting electrode in said dielectric slab, due to the charge accumulation, and converting the floating DC voltage into an AC voltage representative of a charge buildup on said electrically conducting electrode.

41. The satellite according to claim 40 wherein said at least one sensor unit is two or more sensor units pre-positioned with respect to each other.

42. The satellite according to claim 41 wherein said detection means includes a synchronous detection circuit, a first metallic diaphragm electrically connected to said electrically conducting electrode so that it acquires the floating DC voltage potential developed on the electrically conducting electrode to which it is attached, an electrically grounded second metallic diaphragm spaced from said first metallic diaphragm and substantially parallel thereto, vibration means for vibrating said second metallic diaphragm at a pre-selected frequency to oscillate a capacitance between said first and second metallic diaphragms, said first metallic diaphragm being capacitively coupled to said synchronous detection circuit wherein said oscillating capacitance induces an oscillating charge on said first metallic diaphragm, resulting in an oscillating current at said pre-selected frequency being injected into the synchronous detection circuit, and wherein said synchronous detection circuit converts said oscillating capacitance to a steady state voltage output indicative of the floating DC voltage buildup on the electrically conducting electrode.

43. The satellite according to claim 42 wherein said detection means includes an oscillator circuit connected to said vibration means for oscillating said vibration means at said pre-selected frequency, said oscillator circuit being connected to said synchronous detection circuit, and wherein said detection means includes an amplifier means through which said oscillating current passes, said amplifier means being connected to said synchronous detection circuit, said synchronous detection means including an amplifier turned on and off at half-cycle intervals as a consequence of a half-wave rectifier means operating on a fraction of the oscillator circuit signal and wherein another fraction of the oscillator circuit signal drives the vibration means, and wherein a half-wave-rectified signal is filtered through a filter means to remove ripple and is then passed to a DC amplifier means the output of which is the DC voltage signal proportional to the floating DC voltage induced in the electrically conducting electrode embedded in the dielectric slab.

44. The satellite according to claim 43 wherein said vibration means is a piezoelectric crystal bonded to said second metallic diaphragm.

45. The satellite according to claim 43 including a voltage digitization means for converting said DC voltage signal to a digital signal, and data storage, retrieval and transmission means for storing, retrieving and transmitting said digital signal.

46. The satellite according to claim 41 wherein each sensor unit contains a dielectric slab made of a dielectric material different from the dielectric slabs in the other compartments with each dielectric material corresponding to a dielectric component of a satellite.

47. The satellite according to claim 46 wherein said dielectric material from which said dielectric slabs are produced is selected from the group consisting of Mylar, Kapton, Rexolite, Kevlar, Teflon, acrylic, ceramic, fiberglass, and composites thereof.

* * * * *